E. F. HARTSHORN.
SPEAR FOR SPRING SHADE ROLLERS.
APPLICATION FILED JUNE 25, 1910.
1,039,939. Patented Oct. 1, 1912.
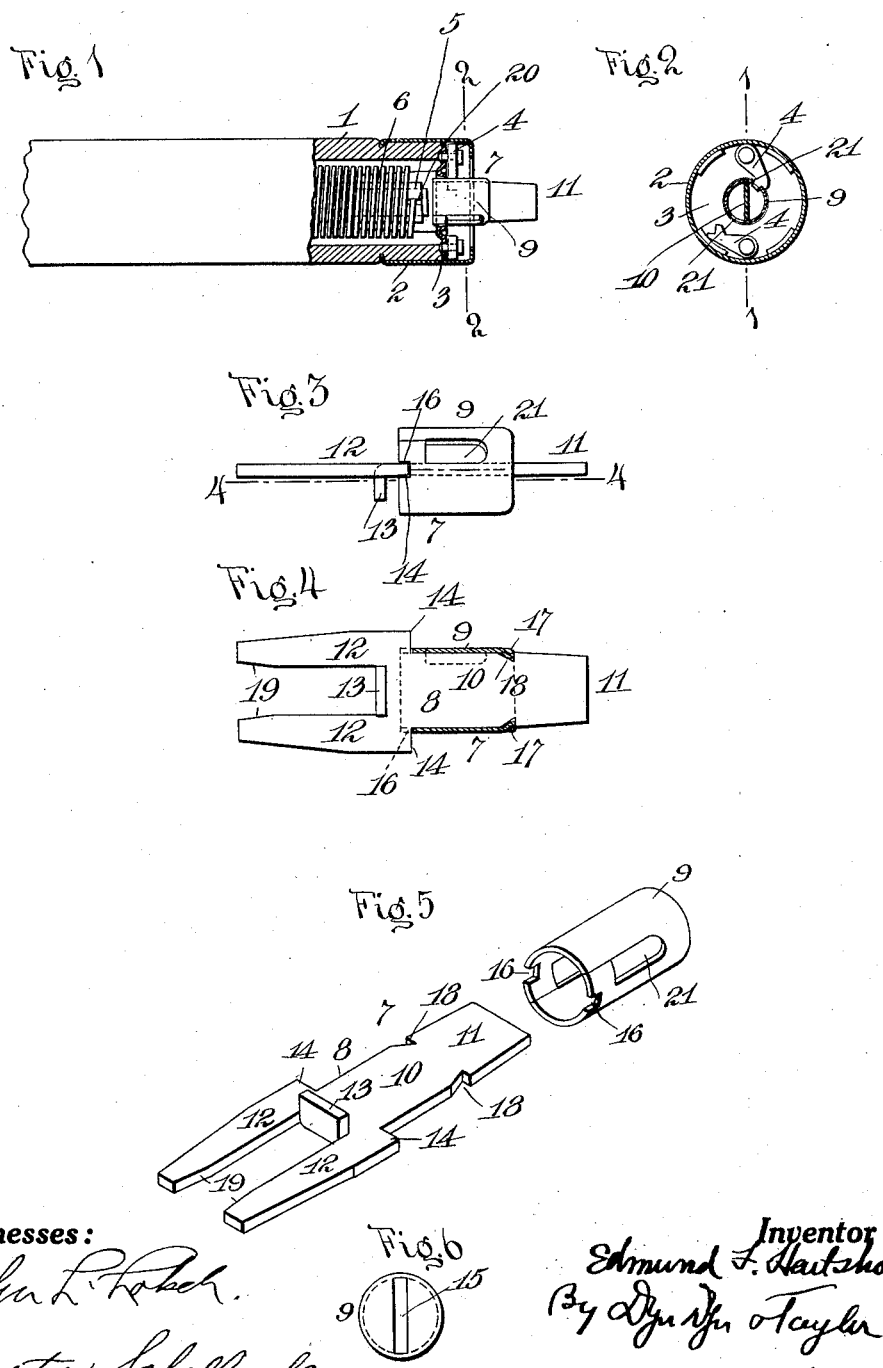

UNITED STATES PATENT OFFICE.

EDMUND F. HARTSHORN, OF NEWARK, NEW JERSEY, ASSIGNOR TO STEWART HARTSHORN COMPANY, OF EAST NEWARK, NEW JERSEY, A CORPORATION OF NEW JERSEY.

SPEAR FOR SPRING SHADE-ROLLERS.

1,039,939.     Specification of Letters Patent.     Patented Oct. 1, 1912.

Application filed June 25, 1910. Serial No. 568,764.

*To all whom it may concern:*

Be it known that I, EDMUND F. HARTSHORN, a citizen of the United States of America, residing in Newark, county of Essex, State of New Jersey, have invented a certain new and useful Spear for Spring Shade-Rollers, of which the following is a specification.

The object I have in view is the production of a spear for spring shade rollers, which will be durable, cheap, and easily attached, and effective.

Further objects will appear from consideration of the embodiment of my invention set forth in the following specification and accompanying drawings, considered together or separately.

In the drawings: Figure 1 is a view, partly in section, on the line 1—1 of Fig. 2, of the spear end of a spring shade roller embodying my invention. Fig. 2 is a section on the line 2—2 of Fig. 1. Fig. 3 is an enlarged plan view of my improved spear. Fig. 4 is a section on the line 4—4 of Fig. 3. Fig. 5 is a perspective view of the two parts of the spear in separated condition; and Fig. 6 is an end view of the cylindrical portion of the spear.

In all of the views, like parts are designated by the same reference characters.

In the drawings, 1 is the roller, 2 is the ferrule, 3 is the cap, 4 the pawls, 5 the spindle, and 6 the spring. These parts are of the usual and well known type. The spear 7, according to my invention, instead of being made of a malleable iron casting as is customary, is made out of sheet material, preferably sheet metal. The spear 7 comprises a base 8, and a cylindrical portion 9. The base 8 is formed with a body 10, the projecting tip 11, two legs 12, 12, and a tail 13. The legs 12, 12 are wider than the body 10, producing shoulders 14. The tail 13 is bent to one side, as shown.

The cylindrical portion 9 is open at one end and closed at the other. On the closed end is a rectangular slot 15 (see Fig. 6), said slot being substantially the same size and shape as the cross-section of the tip 11 which passes through the opening. At the open end of the cylindrical portion 9 are formed oppositely arranged notches 16, 16, said notches being substantially the width of the thickness of the base 8. The notches may be omitted, if desired. Oppositely arranged openings 21 are provided in the cylindrical portion for engagement by the pawls, to produce the ratchet movement. The parts are assembled by introducing the tip 11 and body 10 into the cylindrical portion allowing the tip 11 to project out through the rectangular slot 15. The notches 16, 16 will rest upon the shoulders 14, and assist in preventing relative rotation of the cylindrical portion on the base. The cylindrical portion is held in position by pricking in the sides at 17. Adjacent to these pricked in portions there may be notches 18, of the shape shown.

The spear made as described is introduced in place upon the end of the spindle, by passing the end of the spindle between the two legs 12, 12. The end of the legs may be inclined outward at 19, to guide the spindle in place. The end of the spindle may be provided with oppositely arranged grooves, within which the legs will lie. The tail 13 will rest against the end of the spindle and will prevent the spear being pushed in any farther, and will serve as a means to position the spear on the spindle. A notch 20, at right angles to the beforementioned grooves, is provided on the end of the spindle for the introduction of the and size for that purpose.

The tip 11 engages with the roller supporting bracket and is the proper shape and size for that purpose, I prefer to make the base 8 of sheet metal, stamped to shape, and the cylindrical portion 9 also of sheet metal, stamped to shape, by means of a suitable die.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A spear for shade rollers which comprises a flat base having a body, a tip and legs, said legs and the space between them taken together being of greater width than the body and thereby producing shoulders; and a cylindrical portion surrounding the body and engaging with the shoulders.

2. A spear for shade rollers which comprises a flat base having a body, a tip and legs, said legs and the space between them taken together being of greater width than the body and thereby producing shoulders; and a cylindrical portion surrounding the body and having notches which engage with the shoulders.

3. A spear for shade rollers which comprises a flat base having a body with notches therein, a tip and legs, said legs and the space between them taken together being of greater width than the body and thereby producing shoulders; and a cylindrical portion surrounding the body, there being notches in the cylindrical portion which engage with the shoulders, and there being depressions in the cylindrical portion which engage with the notches in the body.

This specification signed and witnessed this 24th day of June, 1910.

EDMUND F. HARTSHORN.

Witnesses:
R. STANSFIELD,
ALEX C. ADAMS.

Copies of this patent may be obtained for five cents each, by addressing the "Commissioner of Patents, Washington, D. C."